United States Patent
Paulson

(10) Patent No.: US 11,203,179 B2
(45) Date of Patent: *Dec. 21, 2021

(54) SCRATCH-RESISTANT AND OPTICALLY TRANSPARENT MATERIALS AND ARTICLES

(71) Applicant: CORNING INCORPORATED, Corning, NY (US)

(72) Inventor: Charles Andrew Paulson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/793,644

(22) Filed: Feb. 18, 2020

(65) Prior Publication Data

US 2020/0180267 A1 Jun. 11, 2020

Related U.S. Application Data

(62) Division of application No. 15/621,170, filed on Jun. 13, 2017, now Pat. No. 10,603,870.

(Continued)

(51) Int. Cl.
*B32B 7/02* (2019.01)
*C03C 17/22* (2006.01)
(Continued)

(52) U.S. Cl.
CPC .............. *B32B 7/02* (2013.01); *B32B 9/04* (2013.01); *B32B 17/06* (2013.01); *B32B 33/00* (2013.01);
(Continued)

(58) Field of Classification Search
CPC .. B32B 7/02; B32B 9/04; B32B 17/06; B32B 33/00; B32B 2307/412; B32B 2307/536;
(Continued)

(56) References Cited

U.S. PATENT DOCUMENTS 9,335,444 B2 * 5/2016 Hart .................... G02B 1/11
9,790,593 B2 * 10/2017 Adib .................... C03C 17/34
(Continued)

FOREIGN PATENT DOCUMENTS

CN 105377782 A 3/2016
CN 105408774 A 3/2016
(Continued)

OTHER PUBLICATIONS

Japanese Patent Application No. 2019-517195, Office Action dated Mar. 29, 2021, 10 pages (5 pages of English Translation and 5 pages of Original Document); Japanese Patent Office.

(Continued)

*Primary Examiner* — Michael M. Bernshteyn
(74) *Attorney, Agent, or Firm* — Shantanu Pathak; William Tucker

(57) ABSTRACT

Embodiments of a scratch-resistant and optically transparent material comprising silicon, aluminum, nitrogen, and optionally oxygen are disclosed. In one or more embodiments, the material exhibits an extinction coefficient (k) at a wavelength of 400 nm of less than about $1 \times 10^{-3}$, and an average transmittance of about 80% or greater, over an optical wavelength regime in the range from about 380 nm to about 780 nm, as measured through the material having a thickness of about 0.4 micrometer. In one or more embodiments, the material comprises an intrinsic maximum hardness of about 12 GPa or greater as measured on a major surface of the material having a thickness of about 400 by a Berkovich Indenter Hardness Test along an indentation depth of about 100 nm or greater, low compressive stress and low roughness (Ra). Articles and devices incorporating the material are also disclosed.

20 Claims, 6 Drawing Sheets

Related U.S. Application Data

(60) Provisional application No. 62/349,506, filed on Jun. 13, 2016.

(51) Int. Cl.
| | | |
|---|---|---|
| *G02B 1/115* | (2015.01) | |
| *C03C 21/00* | (2006.01) | |
| *G02B 1/14* | (2015.01) | |
| *B32B 9/04* | (2006.01) | |
| *B32B 17/06* | (2006.01) | |
| *B32B 33/00* | (2006.01) | |

(52) U.S. Cl.
CPC .......... *C03C 17/225* (2013.01); *C03C 21/002* (2013.01); *G02B 1/115* (2013.01); *G02B 1/14* (2015.01); *B32B 2307/412* (2013.01); *B32B 2307/536* (2013.01); *B32B 2307/584* (2013.01); *C03C 2217/281* (2013.01); *C03C 2217/29* (2013.01); *C03C 2217/732* (2013.01); *C03C 2217/734* (2013.01); *C03C 2217/78* (2013.01); *C03C 2218/155* (2013.01); *C08G 2261/57* (2013.01)

(58) Field of Classification Search
CPC ............ B32B 2307/584; C03C 17/225; C03C 21/002; C03C 2217/732; C03C 2217/78; C03C 2217/734; C03C 2217/29; C03C 2217/281; C03C 2218/155; G02B 1/115; G02B 1/14; G02B 2261/57
USPC ......................................................... 428/142
See application file for complete search history.

(56) References Cited

U.S. PATENT DOCUMENTS

| | | | | |
|---|---|---|---|---|
| 2014/0334006 | A1* | 11/2014 | Adib .................. | C23C 14/10 359/580 |
| 2014/0335332 | A1* | 11/2014 | Bellman ............. | G02B 1/105 428/212 |
| 2014/0376094 | A1* | 12/2014 | Bellman ............. | G02B 1/113 359/580 |
| 2014/0377522 | A1 | 12/2014 | Koch et al. | |
| 2015/0322270 | A1* | 11/2015 | Amin .................. | C03C 17/3435 428/141 |
| 2015/0323705 | A1* | 11/2015 | Hart .................... | G02B 27/0025 359/580 |
| 2016/0083835 | A1 | 3/2016 | Adib et al. | |

FOREIGN PATENT DOCUMENTS

| | | | |
|---|---|---|---|
| KR | 10-2016-0060075 A | 5/2016 | |
| TW | 201518114 A | 5/2015 | |
| TW | 201546480 A | 12/2015 | |
| TW | 201602623 A | 1/2016 | |
| WO | 2015/044342 A1 | 4/2015 | |
| WO | 2015/076914 A1 | 5/2015 | |
| WO | WO-2015076914 A1 * | 5/2015 | ......... C03C 17/3435 |
| WO | 2015/175390 A1 | 11/2015 | |
| WO | 2016/019269 A1 | 2/2016 | |

OTHER PUBLICATIONS

Bernhardt et al. "Properties of amorphous SiAlON thin films grown by RF magnetron co-sputtering" Surface & Coatings Technology 258 (2014) 1191-1195.
Ekstrom and Nygren, "SiAlON Ceramics" J . Am. Cerm. Soc., 75 [21 259-76 (1992).
Henager and Pawlewicz, "Thermal conductivities of thin, sputtered optical films," Jan. 1, 1993. Applied Optics vol. 32, No. 1, pp. 91-101.
International Search Report and Written Opinion of the International Searching Authority; PCT/US2017/037120; dated Sep. 5, 2017; 10 Pages; European Patent Office.
Knoll and Henaget, "Optical and physical properties of sputtered Si: Al: O: N films" J. Mater. Res., vol. 7, No. 5, May 1992.
Korean Patent Application No. 10-2019-7000841, Office Action dated Oct. 30, 2020, 10 pages (4 page of English Translation and 6 pages of Original Document); Korean Patent Office.
Liu et al. "Preparation and tunable optical properties of ion beam sputtered SiAlON thin films" Vacuum 101 (2014) 1-5.
Maeno et al. "Properties and Structure of AlSiN and AlSiON films" IEEE Translation Journal on Magnetics in Japan, vol. 5, No. 1, Jan. 1990, pp. 59-67.
Moreira da Silva et al. "Mechanical properties of Sialon" Materials Science and Engineering A209 (1996) 175-179.
Oliver and Pharr, "Measurement of Hardness and Elastic Modulus by Instrument Indentation: Advances in Understanding and Refinements to Methodology." J. Mater. Res., vol. 19, No. 1, 2004, 3-20.
Oliver and Pharr, "An improved technique for determining hardness and elastic modulus using load and displacement sensing indentation experiments." J. Mater. Res., vol. 7, No. 6, 1992, 1564-1583.
Riley, "Silicon Nitride and Related Materials" J. Am. Ceram. Soc., 83 [2] 245-65 (2000).
Chinese Patent Application No. 201780036912.6, Office Action dated May 31, 2021; 20 pages (English Translation only); Chinese Patent Office.
Taiwanese Patent Application No. 106119599, Office Action dated Jan. 17, 2021, 3 pages (English Translation Only); Taiwanese Patent Office.

\* cited by examiner

SCRATCH-RESISTANT AND OPTICALLY TRANSPARENT MATERIALS AND ARTICLES

CROSS-REFERENCE TO RELATED APPLICATIONS

This application is a divisional of U.S. patent application Ser. No. 15/621,170, filed on Jun. 13, 2017, now U.S. Pat. No. 10,603,870, which claims the benefit of priority under 35 U.S.C. § 119 of U.S. Provisional Application Ser. No. 62/349,506 filed on Jun. 13, 2016, the contents of each of which are relied upon and incorporated herein by reference in their entirety.

BACKGROUND

The disclosure relates to materials exhibiting low optical absorption, high hardness and low compressive stress, and more particularly to materials comprising silicon, aluminum, nitrogen and optionally oxygen that exhibit low optical absorption, high hardness and low compressive stress and tunable compressive stress and articles including such materials.

Cover articles are often used to protect critical devices within electronic products, to provide a user interface for input and/or display, and/or many other functions. Such products include mobile devices, such as smart phones, mp3 players, laptops, and computer tablets. Cover articles also include architectural articles, transportation articles (e.g., articles used in automotive applications, trains, aircraft, sea craft, etc.), appliance articles, or any article that requires some transparency, scratch-resistance, low stress or a combination thereof. These applications often demand scratch-resistance and strong optical performance characteristics, in terms of maximum light transmittance and minimum reflectance. Furthermore, some cover applications require that the color exhibited or perceived, in reflection and/or transmission, does not change appreciably as the viewing angle is changed. In display applications, this is because, if the color in reflection or transmission changes with viewing angle to an appreciable degree, the user of the product will perceive a change in color or brightness of the display, which can diminish the perceived quality of the display. In other applications, changes in color may negatively impact the aesthetic requirements or other functional requirements.

The optical performance of cover articles can be improved by using various anti-reflective coatings; however known anti-reflective coatings are susceptible to wear or abrasion. Such abrasion can compromise any optical performance improvements achieved by the anti-reflective coating. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the requisite mechanical properties, such as hardness, for use in mobile devices, architectural articles, transportation articles or appliance articles. Nitrides and diamond-like coatings may exhibit high hardness values but such materials do not exhibit the transmittance needed for such applications.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials disposed experiencing abrasion damage can also oxidize, which further degrades the durability of the coating.

Known anti-reflective coatings are also susceptible to scratch damage and, often, even more susceptible to scratch damage than the underlying substrates on which such coatings are disposed. In some instances, a significant portion of such scratch damage includes microductile scratches, which typically include a single groove in a material having extended length and with depths in the range from about 100 nm to about 500 nm. Microductile scratches may be accompanied by other types of visible damage, such as sub-surface cracking, frictive cracking, chipping and/or wear. Evidence suggests that a majority of such scratches and other visible damage is caused by sharp contact that occurs in a single contact event. Once a significant scratch appears on the cover substrate, the appearance of the article is degraded since the scratch causes an increase in light scattering, which may cause significant reduction in brightness, clarity and contrast of images on the display. Significant scratches can also affect the accuracy and reliability of articles including touch sensitive displays. Single event scratch damage can be contrasted with abrasion damage. Single event scratch damage is not caused by multiple contact events, such as reciprocating sliding contact from hard counter face objects (e.g., sand, gravel and sandpaper), nor does it typically generate heat, which can degrade chemical bonds in the film materials and cause flaking and other types of damage. In addition, single event scratching typically does not cause oxidization or involve the same conditions that cause abrasion damage and therefore, the solutions often utilized to prevent abrasion damage may not also prevent scratches. Moreover, known scratch and abrasion damage solutions often compromise the optical properties.

Accordingly, there is a need for new cover articles, and methods for their manufacture, which are scratch resistant, exhibit low compressive stress values, low surface roughness, and have improved optical performance.

SUMMARY

A first aspect of this disclosure pertains to an optically transparent material comprising a composition comprising silicon, aluminum and nitrogen. In one or more embodiments, the composition includes silicon present in an amount of about 25 atomic % or less, aluminum, oxygen in an amount of in the range from about 0 atomic % to about 15 atomic %, and nitrogen. In one or more embodiments, the composition includes oxygen. For example, the composition may include at least about 0.1 atomic % oxygen. In one or more embodiments, the composition comprises silicon in an amount in a range from about 5 atomic % to about 25 atomic %, aluminum in an amount in a range from about 25 atomic % to about 45 atomic %, oxygen in an amount in a range from about 0 atomic % to about 15 atomic %, and nitrogen in an amount in a range from about 35 atomic % to about 50 atomic %. In one or more embodiments, the composition comprises silicon in an amount in a range from about 7 atomic % to about 17 atomic %, aluminum in an amount in a range from about 33 atomic % to about 43 atomic %, oxygen in an amount in a range from about 0 atomic % to about 10 atomic %, and nitrogen in an amount in a range from about 40 atomic % to about 50 atomic %.

In one or more embodiments, the optically transparent material comprises an extinction coefficient (k) at a wavelength of 400 nm of less than about $1 \times 10^{-3}$, and an average transmittance of about 80% or greater, over an optical wavelength regime in the range from about 380 nm to about 780 nm, as measured through the material having a thickness of about 2 micrometers. In one or more embodiments, the optically transparent material exhibits an intrinsic maximum hardness of about 12 GPa or greater as measured on a major surface of the material having a thickness of about 400 nm by a Berkovich Indenter Hardness Test along an indentation depth of about 100 nm or greater. In one or more embodiments, the optically transparent material exhibits a tunable compressive stress, which may be in the range from about −1000 MPa to about 100 MPa (or from about −300 MPa to about 100 MPa), when disposed on a substrate. In one or more embodiments, the optically transparent material comprises a refractive index of about 2.0 or greater, as measured at a wavelength of 550 nm.

In one or more embodiments, the optically transparent material comprises a roughness (Ra) of less than 1.5 nm as measured by atomic force microscopy on the major surface along an imagining area having dimensions of 2 micrometers by 2 micrometers.

A second aspect of this disclosure pertains to an article comprising a substrate comprising a major surface, and an optical film disposed on the major surface and forming a coated surface. In one or more embodiments, the optical film comprises the optically transparent material described herein. In one or more embodiments, the substrate includes substrate transmittance color coordinates ($a^*_{substrate}$, $b^*_{substrate}$) and substrate reflectance color coordinates ($a^*_{substrate}$, $b^*_{substrate}$), both in the ($L^*$, $a^*$, $b^*$) colorimetry system that are measured at an incidence illumination angle of 5 degrees from normal incidence under an International Commission on Illumination illuminant. In one or more embodiments, the article exhibits article transmittance color coordinates in the ($L^*$, $a^*$, $b^*$) colorimetry system, when measured at an incidence illumination angle of normal incidence under an International Commission on Illumination illuminant, comprising a reference point color shift of less than about 2 from a reference point, the reference point comprising one of the color coordinates ($a^*=0$, $b^*=0$) and the substrate transmittance color coordinates. In one or more embodiments, the article exhibits article reflectance color coordinates in the ($L^*$, $a^*$, $b^*$) colorimetry system when measured at the coated surface at an incidence illumination angle of 5 degrees from normal incidence under an International Commission on Illumination illuminant, exhibiting a reference point color shift of less than about 5 from a reference point as measured at the anti-reflective surface, the reference point comprising at least one of the color coordinates ($a^*=0$, $b^*=0$), the color coordinates ($a^*=-2$, $b^*=-2$), and the substrate reflectance color coordinates. When the reference point is the color coordinates ($a^*=0$, $b^*=0$), the color shift is defined by $\sqrt{((a^*_{article})^2+(b^*_{article})^2)}$. When the reference point is the color coordinates ($a^*=-2$, $b^*=-2$), the color shift is defined by $\sqrt{((a^*_{article}+2)^2+(b^*_{article}+2)^2)}$. When the reference point is the color coordinates of the substrate, the color shift is defined by $\sqrt{((a^*_{article}-a^*_{substrate})^2+(b^*_{article}-b^*_{substrate})^2)}$.

In one or more embodiments, the optical film may have a thickness in a range from about 200 nm to about 3 micrometers. In one or more embodiments, the article exhibits a maximum hardness of about 12 GPa or greater as measured on the coated surface by a Berkovich Indenter Hardness Test along an indentation depth of about 100 nm or greater. In one or more embodiments, the article exhibits a single side average photopic reflectance measured at the coated surface of about 8% or less over an optical wavelength regime in the range from about 380 nm to about 780 nm. In one or more embodiments, the single side average photopic reflectance of the article is about 2% or less over the optical wavelength regime at a viewing angle in the range from about 6 degrees to about 40 degrees.

In one or more embodiments, the optically transparent material comprises a first layer and the optical film further comprises a second layer. In one embodiment, the first layer is disposed on the major surface of the substrate and the second layer is disposed on the first layer. In another embodiment, the second layer is disposed on the major surface of the substrate and the first layer is disposed on the second layer. In one or more embodiments, the first layer or the second layer comprises a thickness in the range from about 0.4 micrometer to about 3 micrometers.

In one or more embodiments, the optically transparent material comprises a refractive index greater than a refractive index of the second layer and wherein the optical film comprises a plurality of first layers and second layers that alternate.

In some embodiments, the substrate comprises a Young's modulus of about 60 GPa or greater. The substrate according to one or more embodiments may include an amorphous substrate or a crystalline substrate. Exemplary amorphous substrates include glasses such as soda lime glass, alkali aluminosilicate glass, alkali containing borosilicate glass and alkali aluminoborosilicate glass. In some embodiments, the substrate is a strengthened glass comprising a compressive stress (CS) layer with a surface CS of at least 200 MPa extending from a surface of the strengthened glass to a depth of compression of about 10 μm or greater.

A third aspect of this disclosure pertains to a device comprising a housing having front, back, and side surfaces, electrical components that are at least partially inside the housing, a display at or adjacent to the front surface of the housing, and a cover article disposed over the display. The cover article may include the articles described herein.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
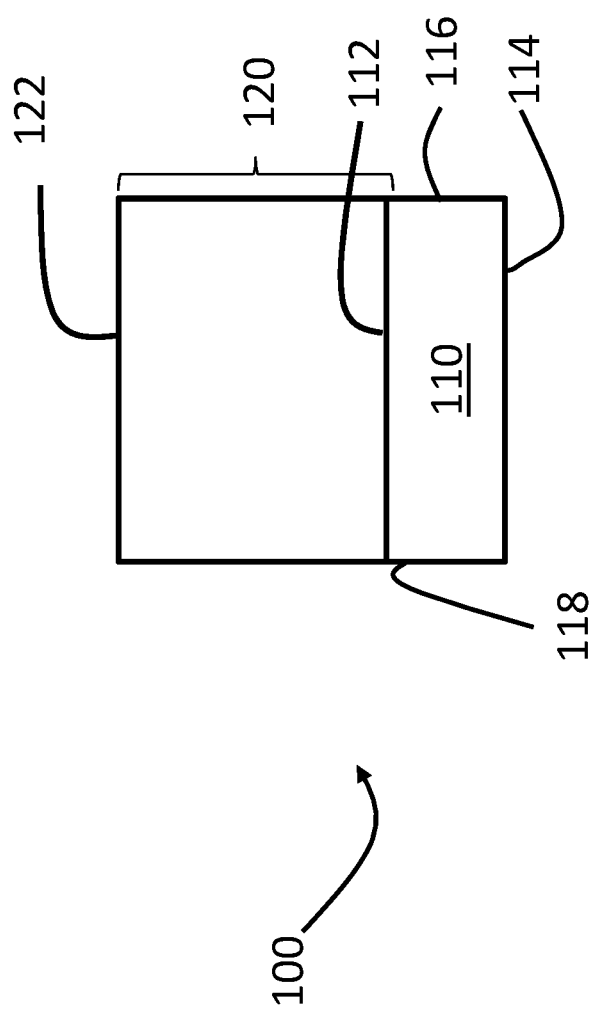
FIG. 1 is a side view of an article, according to one or more embodiments.

Reference will now be made in detail to various embodiments.

A first aspect of this disclosure pertains to an optically transparent material that exhibits high hardness, high transmittance over an optical wavelength regime in the range from about 380 nm to about 780 nm, and low optical absorption at a wavelength of about 400 nm. In one or more embodiments, the optically transparent material also exhibits low surface roughness and low compressive stress (when formed on a surface).

In one or more embodiments, the optically transparent material comprises a composition that includes silicon, aluminum and nitrogen. In one or more embodiments, the composition includes oxygen.

The composition of the optically transparent material according to one or more embodiments may include silicon in an amount of about 25 atomic % or less. In some embodiments, the amount of silicon in the composition may be in the range from about 5 atomic % to about 25 atomic %, from about 6 atomic % to about 25 atomic %, from about 8 atomic % to about 25 atomic %, from about 10 atomic % to about 25 atomic %, from about 12 atomic % to about 25 atomic %, from about 14 atomic % to about 25 atomic %, from about 5 atomic % to about 24 atomic %, from about 5 atomic % to about 22 atomic %, from about 5 atomic % to about 20 atomic %, from about 5 atomic % to about 18 atomic %, from about 5 atomic % to about 16 atomic %, from about 5 atomic % to about 14 atomic %, from about 5 atomic % to about 25 atomic %, or from about 7 atomic % to about 17 atomic %.

The composition of the optically transparent material according to one or more embodiments may include some amount of aluminum. In one or more embodiments, the composition comprises aluminum in a range from about 25 atomic % to about 45 atomic %, from about 26 atomic % to about 45 atomic %, from about 28 atomic % to about 45 atomic %, from about 30 atomic % to about 45 atomic %, from about 32 atomic % to about 45 atomic %, from about 34 atomic % to about 45 atomic %, from about 36 atomic % to about 45 atomic %, from about 38 atomic % to about 45 atomic %, from about 40 atomic % to about 45 atomic %, from about 25 atomic % to about 44 atomic %, from about 25 atomic % to about 42 atomic %, from about 25 atomic % to about 40 atomic %, from about 25 atomic % to about 38 atomic %, from about 25 atomic % to about 36 atomic %, from about 25 atomic % to about 34 atomic %, from about 32 atomic % to about 44 atomic %, or from about 33 atomic % to about 43 atomic %.

The composition of the optically transparent material according to one or more embodiments may include some amount of nitrogen. In one or more embodiments, the composition comprises nitrogen in a range from about 35 atomic % to about 50 atomic %, from about 36 atomic % to about 50 atomic %, from about 38 atomic % to about 50 atomic %, from about 40 atomic % to about 50 atomic %, from about 42 atomic % to about 50 atomic %, from about 44 atomic % to about 50 atomic %, from about 46 atomic % to about 50 atomic %, from about 35 atomic % to about 48 atomic %, from about 35 atomic % to about 46 atomic %, from about 35 atomic % to about 44 atomic %, from about 35 atomic % to about 50 atomic %, from about 35 atomic % to about 50 atomic %, from about 35 atomic % to about 50 atomic %, or from about 35 atomic % to about 50 atomic %

According to one or more embodiments, the composition of the optically transparent material may include oxygen. In some embodiments, the amount of oxygen is greater than about 0.1 atomic %. In some embodiments, amount of oxygen may be less than or equal to about 15 atomic %. In one or more embodiments, the composition comprises oxygen in an amount in a range from about 0 atomic % to about 15 atomic %, from about 0 atomic % to about 14 atomic %, from about 0 atomic % to about 12 atomic %, from about 0 atomic % to about 10 atomic %, from about 0 atomic % to about 8 atomic %, from about 0.1 atomic % to about 15 atomic %, from about 0.5 atomic % to about 15 atomic %, from about 1 atomic % to about 15 atomic %, from about 2 atomic % to about 15 atomic %, from about 4 atomic % to about 15 atomic %, from about 5 atomic % to about 15 atomic %, from about 6 atomic % to about 15 atomic %, or from about 7 atomic % to about 15 atomic %.

In one or more embodiments, the optically transparent material exhibits low absorption. For example, in one or more embodiments, the optically transparent material comprises an extinction coefficient (k) at a wavelength of 400 nm of less than about $1\times10^{-3}$, or less than about $1\times10^{-4}$, when measured with respect to a thickness of the optically transparent material of 1 micrometer or 2 micrometers. In some embodiments, the extinction coefficient (k) at a wavelength of 300 nm or 400 nm at this thickness is about $9\times10^{-4}$ or less, about $8\times10^{-4}$ or less, about $7\times10^{-4}$ or less, about $6\times10^{-4}$ or less, about $5\times10^{-4}$ or less, about $4\times10^{-4}$ or less, about $3\times10^{4}$ or less, about $2\times10^{-4}$ or less, about $1\times10^{-4}$ or less, about $9\times10^{-5}$ or less, about $8\times10^{-5}$ or less, about $7\times10^{-5}$ or less, about $6\times10^{-5}$ or less, or about $5\times10^{-5}$ or less.

In one or more embodiments, the optically transparent material exhibits high transmittance when measured with respect to a thickness of the optically transparent material of 1 micrometer or 2 micrometers. For example, the optically transparent material exhibits an average transmittance of about 80% or greater over an optical wavelength regime in the range from about 380 nm to about 780 nm (the "Optical Wavelength Regime"). In one or more embodiments, the optically transparent material exhibits an average transmittance of about 82% or greater, about 84% or greater, about 86% or greater, about 88% or greater, about 90% or greater, about 92% or greater, about 94% or greater, about 95% or greater, or about 96% or greater, all over the Optical Wavelength Regime and measured with respect to a thickness of 1 micrometer.

In one or more embodiments, the optically transparent material exhibits low reflectance when measured on a surface of the material. For example, the optically transparent material exhibits an average reflectance of about 15% or less over the Optical Wavelength Regime. In one or more embodiments, the optically transparent material exhibits an average reflectance of about 20% or less, about 18% or less, about 16% or less, about 15% or less, about 14% or less, about 12% or less, about 10% or less, about 8% or less, about 6% or less, about 5% or less, about 4% or less, about 3% or less, about 2% or less, about 1% or less, or about 0.5% or less, all over the Optical Wavelength Regime.

As used herein, the term "transmittance" is defined as the percentage of incident optical power within a given wavelength range transmitted through a material (e.g., the optically transparent material, the article, the substrate or portions thereof). The term "reflectance" is similarly defined as the percentage of incident optical power within a given wavelength range that is reflected from a surface (e.g., the surface of the optically transparent material, article, substrate, or portions thereof). Transmittance and reflectance are measured using a specific linewidth. In one or more embodiments, the spectral resolution of the characterization of the transmittance and reflectance is less than 5 nm or 0.02 eV.

The optically transparent material (and articles including such materials) may be described in terms of a hardness measured by a Berkovich Indenter Hardness Test. In one or more embodiments, the optically transparent material exhibits an intrinsic maximum hardness of about 12 GPa or greater, as measured on a major surface of the material having a thickness of 400 nanometers, 500 nanometers, 1 micrometer, or 2 micrometers by a Berkovich Indenter Hardness Test, along an indentation depth of about 100 nanometers or greater. Intrinsic maximum hardness means the hardness of the material itself, without regard to any underlying substrate or surface on which the material may be disposed.

Figure 6:
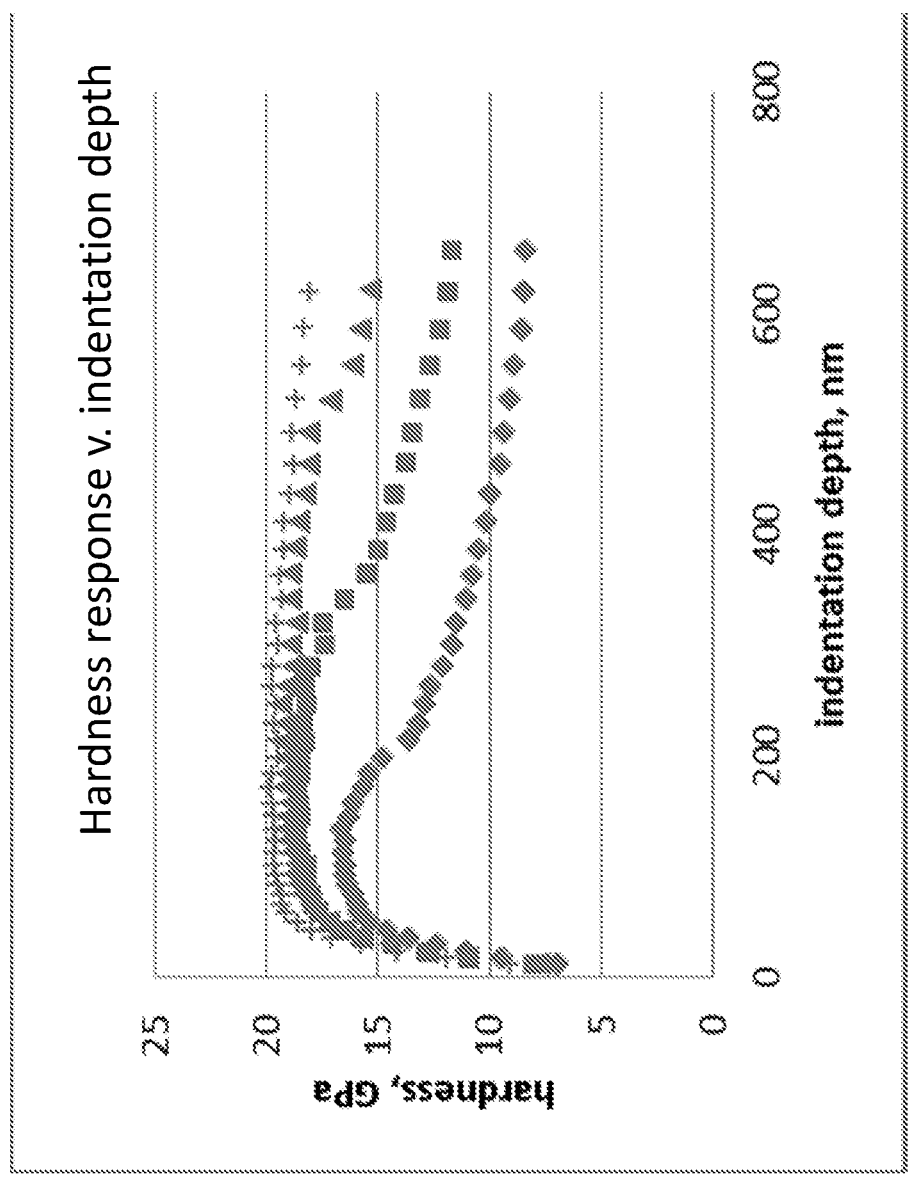
FIG. 6 is a graph illustrating the hardness measurements as a function of indentation depth.

As used herein, the "Berkovich Indenter Hardness Test" includes measuring the hardness of a material on a surface thereof by indenting the surface with a diamond Berkovich indenter. The Berkovich Indenter Hardness Test includes indenting a major surface of the material or the coated surface 122 of the article (or the surface of any one or more of the layers described herein) with the diamond Berkovich indenter to form an indent to an indentation depth as specified (or the entire thickness of the material being tested, whichever is less) and measuring the maximum hardness from this indentation along the entire identified indentation depth range or an identified segment of this indentation depth (e.g., in the range from about 100 nm to about 600 nm), using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. As used herein, hardness refers to a maximum hardness, and not an average hardness. Accordingly, an intrinsic maximum hardness or maximum hardness as a function of the indentation depth is illustrated in FIG. 6. In FIG. 6, each curve illustrates a maximum hardness of 12 GPa long indentation depths greater than 50 nm or greater than 100 nm. Although the hardness decreases at deeper indentation depth, along the indentation range, the maximum measured hardness was 12 GPa or greater, 15 GPa or greater, or even 16 GPa or greater.

In one or more embodiments, the optically transparent material has a substantially amorphous structure as measured by x-ray diffraction and transmission electron microscopy (TEM). In one or more embodiments, the optically transparent material has a noncolumnar morphology, as measured by TEM image along a thickness of 1 micrometer.

In one or more embodiments, the optically transparent material comprises a compressive stress in the range from about −1000 MPa to about 100 MPa. In one or more embodiments, the optically transparent material comprises a compressive stress in the range from about −1000 MPa to about 100 MPa, from about −900 MPa to about 100 MPa, from about −800 MPa to about 100 MPa, from about −700 MPa to about 100 MPa, from about −600 MPa to about 100 MPa, from about −500 MPa to about 100 MPa, from about −400 MPa to about 100 MPa, from about −300 MPa to about 100 MPa, from about −200 MPa to about 100 MPa, from about −100 MPa to about 100 MPa, or from about −50 MPa to about 50 MPa. To determine the compressive stress of the optically transparent material, a 1-micrometer thick layer of the material is disposed on a substrate and the curvature of that underlying substrate is measured, using a profilometer, before and after the layer is formed. The layer is formed using a vacuum deposition technique. The substrate on which the optically transparent material is disposed has a thickness of about 1 mm and length and width dimensions of 5 cm by 5 cm.

In one or more embodiments, the optically transparent material comprises a refractive index of about 2.0 or greater, as measured at a wavelength of 550 nm. In some embodiments, the refractive index may be about 2.05 or greater, 2.1 or greater, 2.15 or greater or 2.2 or greater, as measured at a wavelength of 550 nm.

The optically transparent material of one or more embodiments comprises an intrinsic roughness (Ra) of less than 1.5 nm. The intrinsic roughness is measured by forming a layer of the optically transparent material having a thickness of 0.4 micrometer or greater, using a vacuum deposition technique, and then measuring the roughness on a major surface of the layer using atomic force microscopy (AFM) along an imaging area having dimensions of 2 micrometers×2 micrometers. In one or more embodiments, the optically transparent material comprises an intrinsic roughness (Ra) of about 1.2 nm or less, 1 nm or less, or 0.8 nm or less.

Referring to FIG. 1, a second aspect of this disclosure pertains to an article 100 including a substrate 110, and an optical film 120 disposed on the substrate. The substrate 110 includes opposing major surfaces 112, 114 and opposing minor surfaces 116, 118. The optical film 120 is shown in FIG. 1 as being disposed on a first opposing major surface 112; however, the optical film 120 may be disposed on the second opposing major surface 114 and/or one or both of the opposing minor surfaces, in addition to or instead of being disposed on the first opposing major surface 112. The optical film 120 forms a coated surface 122.

The thickness of the optical film 120 may be about 400 nm or greater while still providing an article that exhibits the optical performance described herein. In some examples, the optical film 120 thickness may be in the range from about 400 nm to about 5 µm (e.g., from about 400 nm to about 5 µm, from about 500 nm to about 5 µm, from about 600 nm to about 5 µm, from about 800 nm to about 5 µm, from about 1 µm to about 5 µm, from about 1.2 µm to about 5 µm, from about 1.4 µm to about 5 µm, from about 1.5 µm to about 5 µm, from about 1.6 µm to about 5 µm, from about 1.8 µm to about 5 µm, from about 2 µm to about 5 µm).

The optical film 120 includes one or more embodiments of the optically transparent material described herein. The optically transparent material may be present in the optical film 120 as a discrete layer. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein.

In one or more embodiments, the optical film 120 may include a second layer 132. In one or more embodiments, the second layer may include a different material than the first layer. The first layer 130 may be disposed directly on the major surface 112 of the substrate (without any intervening layers) and the second layer 132 may be disposed on the first layer 130. In one or more embodiments, the second layer 132 may be disposed directly on the major surface 112 of the substrate (without any intervening layers) and the first layer 130 may be disposed on the second layer 132.

Figure 2:
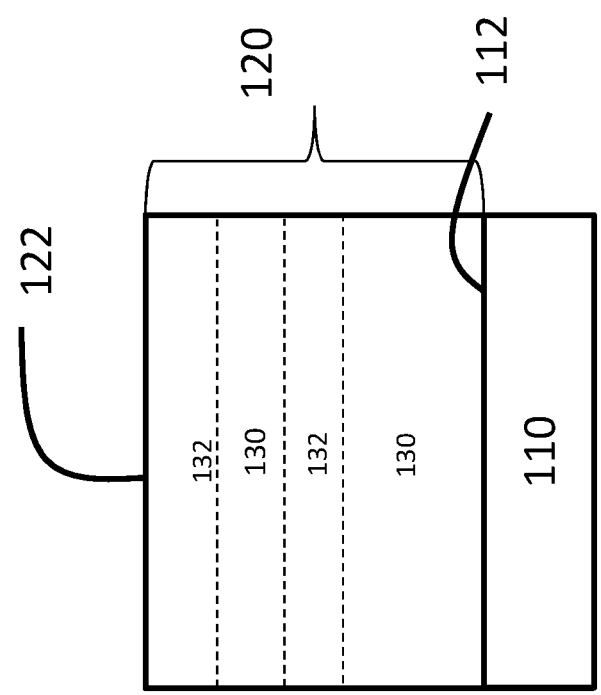
FIG. 2 is a side view of an article, according to one or more specific embodiments.

As shown in FIG. 2, the optical film 120 may include includes alternating layers of the first layer 130 and the second layer 132. In one more embodiments, the second layer may be formed from a different material than the first layer. In some embodiments, the second layer may have a refractive index that is less than the optically transparent material forming the first layer. Examples of suitable materials for use in the second layer include $SiO_2$, $Al_2O_3$, $GeO_2$, SiO, $AlO_xN_y$, $SiO_xN_y$, $Si_uAl_vO_x$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in the second layer may be minimized (e.g., in materials such as $Al_2O_3$ and $MgAl_2O_4$).

In one or more embodiments at least one of the first layer(s) and the second layer(s) may include a specific optical thickness range. As used herein, the term "optical thickness" is determined by (n*d), where "n" refers to the refractive index of the layer and "d" refers to the physical thickness of the layer. In one or more embodiments, at least one of the first layer(s) and the second layer(s) may include an optical thickness in the range from about 2 nm to about 200 nm, from about 10 nm to about 100 nm, from about 15 nm to about 100 nm, from about 15 to about 500 nm, or from about 15 to about 5000 nm. In some embodiments, all of the layers in the optical film 120 may each have an optical thickness in the range from about 2 nm to about 200 nm, from about 10 nm to about 100 nm, from about 15 nm to about 100 nm, from about 15 to about 500 nm, or from about 15 to about 5000 nm. In some cases, at least one layer of the optical film 120 has an optical thickness of about 50 nm or greater. In some cases, each of the first layer(s) has an optical thickness in the range from about 2 nm to about 200 nm, from about 10 nm to about 100 nm, from about 15 nm to about 100 nm, from about 15 to about 500 nm, or from about 15 to about 5000 nm. In other cases, each of the second layer(s) have an optical thickness in the range from about 2 nm to about 200 nm, from about 10 nm to about 100 nm, from about 15 nm to about 100 nm, from about 15 to about 500 nm, or from about 15 to about 5000 nm.

In some embodiments, the thickness of one or more of the layers of the optical film 120 may be minimized. In one or more embodiments, the thickness of the first layer(s) are minimized such that they are less than about 500 nm.

In some embodiments, the thickness or amount of the second layer(s) by volume may be minimized. Without being bound by theory, when the second layer has a lower refractive index than the first layer(s), the second layer(s) are also typically formed from a lower-hardness material, owing to the nature of atomic bonding and electron densities that simultaneously affect refractive index and hardness, and thus minimizing such material can maximize the hardness of the optical film and article, while maintaining the reflectance and color performance described herein. Expressed as a fraction of physical thickness of the optical coating, the second layer(s) may comprise less than about 60%, less than about 50%, less than about 40%, less than about 30%, less than about 20%, less than about 10%, or less than about 5% of the physical thickness of the optical film.

The optical film 120 and the article 100 may be described in terms of a hardness measured by the Berkovich Indenter Hardness Test. Typically, in nanoindentation measurement methods (such as by using a Berkovich indenter) of a film that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the film is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical film structure thickness or the layer thickness.

In some embodiments, the optical film 120 may exhibit an intrinsic maximum hardness of about 8 GPa or greater, about 10 GPa or greater or about 12 GPa or greater (e.g., 14 GPa or greater, 16 GPa or greater, 18 GPa or greater, 20 GPa or greater). The intrinsic maximum hardness of the optical film 120 may be up to about 20 GPa or 30 GPa. The article 100, including the optical film 120 and any additional coatings, as described herein, exhibit a hardness of about 5 GPa or greater, about 8 GPa or greater, about 10 GPa or greater or about 12 GPa or greater (e.g., 14 GPa or greater, 16 GPa or greater, 18 GPa or greater, 20 GPa or greater), as measured on the coated surface 122, by a Berkovitch Indenter Hardness Test. Such measured hardness values may be exhibited by the optical film 120 and/or the article 100 along an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article exhibits a hardness that is greater than the hardness of the substrate (which can be measured on the opposite surface from the coated surface). The thickness of optical film associated with the above optical film intrinsic maximum hardness may be in the range from about 200 nanometers to about 2 micrometers.

In one or more embodiments, the optical film 120 has a substantially amorphous structure as measured by x-ray diffraction and transmission electron microscopy (TEM). In one or more embodiments, the optical film 120 has a noncolumnar morphology, as measured by TEM image along a thickness of 1 micrometer.

In one or more embodiments, the optical film 120 of the article comprises a compressive stress in the range from about −1000 MPa to about 100 MPa. In one or more embodiments, the optical film comprises a compressive stress in the range from about −1000 MPa to about 100 MPa, from about −900 MPa to about 100 MPa, from about −800 MPa to about 100 MPa, from about −700 MPa to about 100 MPa, from about −600 MPa to about 100 MPa, from about −500 MPa to about 100 MPa, from about −400 MPa to about 100 MPa, from about −300 MPa to about 100 MPa, from about −200 MPa to about 100 MPa, from about −100 MPa to about 100 MPa, or from about −50 MPa to about 50 MPa. The compressive stress of the optical film is measured in the same manner as described above with reference to the optically transparent material but measures the radius of curvature of the substrate 110 of the article before and after the optical film is formed.

One aspect of this disclosure pertains to an article that exhibits colorlessness in reflectance and/or transmittance even when viewed at different incident illumination angles under an illuminant. In one or more embodiments, the article exhibits an angular color shift in reflectance and/or transmittance of about 5 or less or about 2 or less between a reference illumination angle and any incidental illumination angles in the ranges provided herein. As used herein, the phrase "color shift" (angular or reference point) refers to the change in both a* and b*, under the CIE L*, a*, b* colorimetry system in reflectance and/or transmittance. It should be understood that unless otherwise noted, the L* coordinate of the articles described herein are the same at any angle or reference point and do not influence color shift. For example, angular color shift may be determined using the following equation: $\sqrt{((a^*_2-a^*_1)^2+(b^*_2-b^*_1)^2)}$, with $a^*_1$, and $b^*_1$ representing the a* and b* coordinates of the article when viewed at incidence reference illumination angle (which may include normal incidence) and $a^*_2$, and $b^*_2$ representing the a* and b* coordinates of the article when viewed at an incident illumination angle, provided that the incident illumination angle is different from the reference illumination angle and in some cases differs from the reference illumination angle by at least about 1 degree, 2 degrees or about 5 degrees. In some instances, an angular color shift in reflectance and/or transmittance of about 10 or less (e.g., 5 or less, 4 or less, 3 or less, or 2 or less) is exhibited by the article when viewed at various incident illumination angles from a reference illumination angle, under an illuminant. In some instances the angular color shift in reflectance and/or transmittance is about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the angular color shift may be about 0. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit an angular color shift in reflectance and/or transmittance of about 2 or less when viewed at incident illumination angle from the reference illumination angle under a CIE F2, F10, F11, F12 or D65 illuminant, or more specifically, under a CIE F2 illuminant.

The reference illumination angle may include normal incidence (i.e., from about 0 degrees to about 10 degrees), or 5 degrees from normal incidence, 10 degrees from normal incidence, 15 degrees from normal incidence, 20 degrees from normal incidence, 25 degrees from normal incidence, 30 degrees from normal incidence, 35 degrees from normal incidence, 40 degrees from normal incidence, 50 degrees from normal incidence, 55 degrees from normal incidence, or 60 degrees from normal incidence, provided the difference between the reference illumination angle and the difference between the incident illumination angle and the reference illumination angle is at least about 1 degree, 2 degrees or about 5 degrees. The incident illumination angle may be, with respect to the reference illumination angle, in the range from about 5 degrees to about 80 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from the reference illumination angle. The article may exhibit the angular color shifts in reflectance and/or transmittance described herein at and along all the incident illumination angles in the range from about 2 degrees to about 80 degrees (or from about 10 degrees to about 80 degrees, or from about 20 degrees to about 80 degrees), when the reference illumination angle is normal incidence. In some embodiments, the article may exhibit the angular color shifts in reflectance and/or transmittance described herein at and along all the incident illumination angles in the range from about 2 degrees to about 80 degrees (or from about 10 degrees to about 80 degrees, or from about 20 degrees to about 80 degrees), when the difference between the incident illumination angle and the reference illumination angle is at least about 1 degree, 2 degrees or about 5 degrees. In one example, the article may exhibit an angular color shift in reflectance and/or transmittance of 5 or less (e.g., 4 or less, 3 or less or about 2 or less) at any incident illumination angle in the range from about 2 degrees to about 60 degrees, from about 5 degrees to about 60 degrees, or from about 10 degrees to about 60 degrees away from a reference illumination angle equal to normal incidence. In other examples, the article may exhibit an angular color shift in reflectance and/or transmittance of 5 or less (e.g., 4 or less, 3 or less or about 2 or less) when the reference illumination angle is 10 degrees and the incident illumination angle is any angle in the range from about 12 degrees to about 60 degrees, from about 15 degrees to about 60 degrees, or from about 20 degrees to about 60 degrees away from the reference illumination angle.

In some embodiments, the angular color shift may be measured at all angles between a reference illumination angle (e.g., normal incidence) and an incident illumination angle in the range from about 20 degrees to about 80 degrees. In other words, the angular color shift may be measured and may be less than about 5 or less than about 2, at all angles in the range from about 0 degrees and 20 degrees, from about 0 degrees to about 30 degrees, from about 0 degrees to about 40 degrees, from about 0 degrees to about 50 degrees, from about 0 degrees to about 60 degrees or from about 0 degrees to about 80 degrees.

In one or more embodiments, the article exhibits a color in the CIE L*, a*, b* colorimetry system in reflectance and/or transmittance such that the distance or reference point color shift between the transmittance color or reflectance coordinates from a reference point is less than about 5 or less than about 2 under an illuminant (which can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting)). In specific examples, the articles exhibit a color shift in reflectance and/or transmittance of about 2 or less when viewed at incident illumination angle from the reference illumination angle under a CIE F2, F10, F11, F12 or D65 illuminant or more specifically under a CIE F2 illuminant. Stated another way, the article may exhibit a transmittance color (or transmittance color coordinates) and/or a reflectance color (or reflectance color coordinates) measured at the coated surface 122 having a reference point color shift of less than about 2 from a reference point, as defined herein. Unless otherwise noted, the transmittance color or transmittance color coordinates are measured on two surfaces of the article including at the coated surface 122 and the opposite bare surface of the article (i.e., 114). Unless otherwise noted, the reflectance color or reflectance color coordinates are measured on only the coated surface 122 of the article. However, the reflectance color or reflectance color coordinates described herein can be measured on both the coated surface 122 of the article and the opposite side of the article (i.e., major surface 114 in FIG. 1) using either a 2-surface measurement (reflections from two sides of an article are both included) or a 1-surface measurement (reflection only from the coated surface 122 of the article is measured).

In one or more embodiments, the reference point may be the origin (0, 0) in the CIE L*, a*, b* colorimetry system (or the color coordinates $a^*=0$, $b^*=0$), the coordinates ($a^*=-2$, $b^*=-2$), or the transmittance or reflectance color coordinates of the substrate. It should be understood that unless otherwise noted, the L* coordinate of the articles described herein are the same as the reference point and do not influence color shift. Where the reference point color shift of the article is defined with respect to the substrate, the transmittance color coordinates of the article are compared to the transmittance color coordinates of the substrate and the reflectance color coordinates of the article are compared to the reflectance color coordinates of the substrate.

In one or more specific embodiments, the reference point color shift of the transmittance color and/or the reflectance color may be less than 1 or even less than 0.5. In one or more specific embodiments, the reference point color shift for the transmittance color and/or the reflectance color may be 1.8, 1.6, 1.4, 1.2, 0.8, 0.6, 0.4, 0.2, 0 and all ranges and sub-ranges therebetween. Where the reference point is the color coordinates $a^*=0$, $b^*=0$, the reference point color shift is calculated by the equation: reference point color shift=$\sqrt{((a^*_{article})^2+(b^*_{article})^2)}$.

Where the reference point is the color coordinates $a^*=-2$, $b^*=-2$, the reference point color shift is calculated by the equation: reference point color shift=$\sqrt{((a^*_{article}+2)^2+(b^*_{article}+2)^2)}$.

Where the reference point is the color coordinates of the substrate, the reference point color shift is calculated by the equation: reference point color shift=$((a^*_{article}-a^*_{substrate})^2+(b^*_{article}-b^*_{substrate})^2)$.

In some embodiments, the article may exhibit a transmittance color (or transmittance color coordinates) and a reflectance color (or reflectance color coordinates) such that the reference point color shift is less than 2 when the reference point is any one of the color coordinates of the substrate, the color coordinates $a^*=0$, $b^*=0$ and the coordinates $a^*=-2$, $b^*=-2$.

In one or more embodiment, the article may exhibit a b* value in reflectance (as measured at the coated surface only) in the range from about $-5$ to about 1, from about $-5$ to about 0, from about $-4$ to about 1, or from about $-4$ to about 0, in the CIE L*, a*, b* colorimetry system at all incidence illumination angles in the range from about 0 to about 60 degrees (or from about 0 degrees to about 40 degrees or from about 0 degrees to about 30 degrees).

In one or more embodiment, the article may exhibit a b* value in transmittance (as measured at the coated surface and the opposite bare surface of the article) of less than about 2 (or about 1.8 or less, about 1.6 or less, 1.5 or less, 1.4 or less, 1.2 or less, or about 1 or less) in the CIE L*, a*, b* colorimetry system at all incidence illumination angles in the range from about 0 to about 60 degrees (or from about 0 degrees to about 40 degrees or from about 0 degrees to about 30 degrees). The lower limit of the b* value in transmittance may be about $-5$.

In some embodiments, the article exhibits an a* value in transmittance (at the coated surface and the opposite bare surface) in the range from about $-1.5$ to about 1.5 (e.g., $-1.5$ to $-1.2$, $-1.5$ to $-1$, $-1.2$ to 1.2, $-1$ to 1, $-1$ to 0.5, or $-1$ to 0) at incident illumination angles in the range from about 0 degrees to about 60 degrees under illuminants D65, A, and F2. In some embodiments, the article exhibits a b* value in transmittance (at the coated surface and the opposite bare surface) in the range from about $-1.5$ to about 1.5 (e.g., $-1.5$ to $-1.2$, $-1.5$ to $-1$, $-1.2$ to 1.2, $-1$ to 1, $-1$ to 0.5, or $-1$ to 0) at incident illumination angles in the range from about 0 degrees to about 60 degrees under illuminants D65, A, and F2.

In some embodiments, the article exhibits an a* value in reflectance (at only the coated surface) in the range from about $-5$ to about 2 (e.g., $-4.5$ to 1.5, $-3$ to 0, $-2.5$ to 0.25) at incident illumination angles in the range from about 5 degrees to about 60 degrees under illuminants D65, A, and F2. In some embodiments, the article exhibits a b* value in reflectance (at only the coated surface) in the range from about −7 to about 0 at incident illumination angles in the range from about 5 degrees to about 60 degrees under illuminants D65, A, and F2.

The article of one or more embodiments may exhibit an average transmittance of about 80% or greater over the Optical Wavelength Regime. In one or more embodiments, the article exhibits an average transmittance of about 82% or greater, about 84% or greater, about 86% or greater, about 88% or greater, about 90% or greater, about 92% or greater, about 94% or greater, about 95% or greater, or about 96% or greater, all over the Optical Wavelength Regime.

In one or more embodiments, the article exhibits low average reflectance. For example, the article may exhibit an average reflectance of about 15% or less over the Optical Wavelength Regime (e.g., about 20% or less, about 18% or less, about 16% or less, about 15% or less, about 14% or less, about 12% or less, about 10% or less, about 8% or less, about 6% or less, about 5% or less, about 4% or less, about 3% or less, about 2% or less, about 1% or less, or about 0.5% or less).

In some embodiments, these average reflectance and average transmittance values may be a total reflectance or total transmittance (taking into account reflectance or transmittance on both the coated surface 122 and the opposite major surface 114). In some embodiments, the reported average reflectance of the article may be an average single-side reflectance of the article, as measured on the coated surface 122 only (without taking into account the opposite surface). Unless otherwise specified, the average reflectance is measured at an incident illumination angle of 5 degrees from normal and the average transmittance is measured at normal incidence.

Substrate

The substrate 110 may include an inorganic material and may include an amorphous substrate, a crystalline substrate or a combination thereof. The substrate 110 may be formed from man-made materials and/or naturally occurring materials (e.g., quartz and polymers). For example, in some instances, the substrate 110 may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 110 may specifically exclude polymeric, plastic and/or metal substrates. The substrate may be characterized as alkali-including substrates (i.e., the substrate includes one or more alkalis). In one or more embodiments, the substrate exhibits a refractive index in the range from about 1.45 to about 1.55. In specific embodiments, the substrate 110 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the substrate 110 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or a spinel ($MgAl_2O_4$) layer).

The substrate 110 of one or more embodiments may have a hardness that is less than the hardness of the article (as measured by the Berkovich Indenter Hardness Test described herein). The hardness of the substrate may be measured using known methods in the art, including but not limited to the Berkovich Indenter Hardness Test or Vickers hardness test.

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In some embodiments, these light reflectance and transmittance values may be a total reflectance or total transmittance (taking into account reflectance or transmittance on both major surfaces of the substrate) or may be observed on a single side of the substrate (i.e., on the anti-reflective surface 122 only, without taking into account the opposite surface). Unless otherwise specified, the average reflectance or transmittance is measured at an incident illumination angle of 0 degrees (however, such measurements may be provided at incident illumination angles of 45 degrees or 60 degrees). The substrate 110 may optionally exhibit a color, such as white, black, red, blue, green, yellow, orange etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

The degree of strengthening may be quantified based on the parameters of central tension (CT), surface compressive stress (CS), and depth of compression (DOC). The strengthened substrate specifically includes a CS layer (with a surface CS value) that extends from one or both the first major surface 112 and the second major surface 114 to a DOC. A CT layer or region extends from DOC to the central portion of the substrate. As used herein, DOC refers to the depth at which the stress within the substrate changes compressive to tensile. At the DOC, the stress crosses from a positive (compressive) stress to a negative (tensile) stress and thus exhibits a stress value of zero.

Throughout this description, however, CS for the substrate is expressed as a positive or absolute value—i.e., as recited herein, CS=|CS|.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

DOC and CT values are measured using a scattered light polariscope (SCALP) technique known in the art.

In one embodiment, a strengthened substrate 110 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOC of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOC greater than 15 μm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the substrate comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $(Al_2O_3+B_2O_3)/\Sigma$modifiers (i.e., sum of modifiers) is greater than 1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma$modifiers (i.e., sum of modifiers) is greater than 1.

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS- System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 100 µm to about 5 mm. Example substrate 110 physical thicknesses range from about 100 µm to about 500 µm (e.g., 100, 200, 300, 400 or 500 µm). Further example substrate 110 physical thicknesses range from about 500 µm to about 1000 µm (e.g., 500, 600, 700, 800, 900 or 1000 µm). The substrate 110 may have a physical thickness greater than about 1 mm (e.g., about 2, 3, 4, or 5 mm). In one or more specific embodiments, the substrate 110 may have a physical thickness of 2 mm or less or less than 1 mm. The substrate 110 may be acid polished or otherwise treated to remove or reduce the effect of surface flaws.

In one or more embodiments, the substrate may have a substrate transmittance color coordinates ($a^*_{substrate}$, $b^*_{substrate}$) and substrate reflectance color coordinates ($a^*_{substrate}$, $b^*_{substrate}$), wherein the substrate transmittance color coordinates and the substrate reflectance color coordinates are in the (L*, a*, b*) colorimetry system and are measured at an incidence illumination angle of 5 degrees from normal incidence under an International Commission on Illumination illuminant. These values may be used to calculate the reference point color shift of the article, as described above.

A third aspect of this disclosure pertains to devices that include the articles described herein. For example, the devices may include any device including a display or requiring, strengthened thin glass. In one or more embodiments the devices are electronic devices, which can include mobile devices such as mobile phones, laptops, tablets, mp3 players, navigation devices and the like, or stationary devices such as computers, electronic displays, in vehicle information/entertainment systems, billboards, point of sale systems, navigation systems, and the like). In some embodiments, the articles 100 described herein may be incorporated into architectural articles (walls, fixtures, panels, windows, etc.), transportation articles (e.g., glazing or interior surfaces in automotive applications, trains, aircraft, sea craft, etc.), appliances (e.g., washers, dryers, dishwashers, refrigerators and the like), or any article that requires some fracture resistance.

Figure 3:
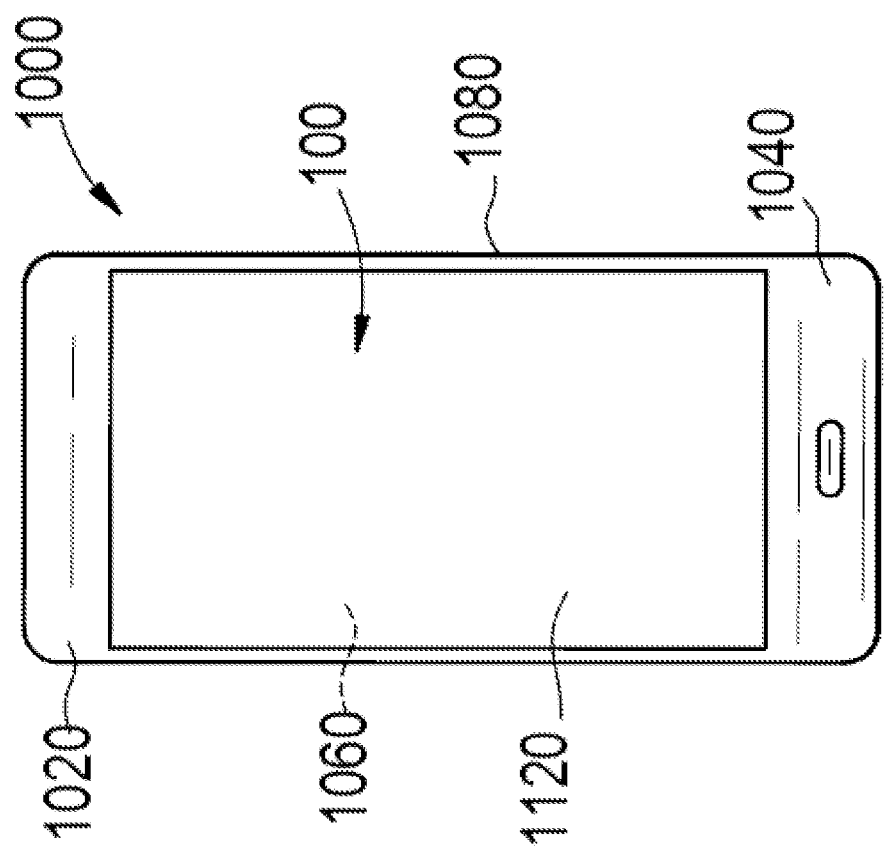
FIG. 3 is a front view of a device according to one or more embodiments.

As shown in FIG. 3, an electronic device 1000 may include an article 100 according to one or more embodiments described herein. The device 1000 includes a housing 1020 having front 1040, back 1060, and side surfaces 1080; electrical components (not shown) that are at least partially inside or entirely within the housing and including at least a controller, a memory, and a display 1120 at or adjacent to the front surface of the housing. The article 100 is shown as a cover disposed at or over the front surface of the housing such that it is over the display 1120. In some embodiments, the article may be used as a back cover.

EXAMPLES

Various embodiments will be further clarified by the following examples.

Examples 1-22

Examples 1-22 included single layers of optically transparent materials including compositions with varying amounts of silicon, aluminum, oxygen and nitrogen. The layers were formed on a chemically strengthened alkali aluminosilicate glass substrate having a thickness of 1 mm, using a physical vapor deposition process in a vacuum chamber supplied by AJA-Industries. The deposition conditions for each of Examples 1-22, the resulting thickness (nm) and growth rate (GR) (nm/second), is provided in Table 1. The layers were formed using DC reactive sputtering for the aluminum source (targets) combined with RF sputtering for the silicon source (target). The targets were 3" diameter silicon and 3" diameter aluminum. There were two aluminum targets (both using DC excitation, and one silicon target using the RF excitation. The reactive gasses were nitrogen and oxygen, and the "working" (or inert) gas was argon. The power supplied to the silicon (in watts) was radio frequency (RF) at 13.56 Mhz. The power supplied to the aluminum was DC (in watts).

Table 2 shows the measured refractive index values (n) (at a wavelength of 550 nm), the extinction coefficient values (k) (at a wavelength of 400 nm and also a wavelength of 300 nm), Ra roughness (as measured by AFM) from an imaging area of 2 micrometers by 2 micrometers, compressive stress (measured as described herein), and a maximum hardness (as measured by the Berkovich Indenter Hardness Test to 100 nm deep or greater). Table 3 shows the composition in atomic % of silicon, aluminum, oxygen and nitrogen.

TABLE 1

Deposition conditions for Examples 1-22.

| Ex. | material | Ar (sccm) | N2 (sccm) | O2 (sccm) | Power Al (W) | Power Si (W) | Pressure (mtorr) | Thickness (nm) | GR (nm/s) |
|---|---|---|---|---|---|---|---|---|---|
| 1 | SiAlN | 30 | 40 | 0 | 300 | 100 | 1.5 | 440.6 | 0.113 |
| 2 | SiAlON | 30 | 40 | 0.4 | 300 | 100 | 1.5 | 449.3 | 0.109 |
| 3 | SiAlON | 30 | 40 | 1 | 300 | 100 | 1.5 | 433.7 | 0.098 |
| 4 | SiAlN | 30 | 40 | 0 | 300 | 200 | 1.5 | 426.0 | 0.123 |
| 5 | SiAlON | 30 | 40 | 0.4 | 300 | 200 | 1.5 | 458.1 | 0.117 |
| 6 | SiAlON | 30 | 40 | 1 | 300 | 200 | 1.5 | 439.9 | 0.110 |
| 7 | SiAlN | 30 | 40 | 0 | 300 | 300 | 1.5 | 420.0 | 0.133 |
| 8 | SiAlON | 30 | 40 | 0.4 | 300 | 300 | 1.5 | 462.8 | 0.130 |
| 9 | SiAlON | 30 | 40 | 1 | 300 | 300 | 1.5 | 462.2 | 0.126 |
| 10 | SiAlN | 30 | 40 | 0 | 300 | 400 | 1.5 | 527.8 | 0.152 |
| 11 | SiAlON | 30 | 40 | 0.4 | 300 | 400 | 1.5 | 526.1 | 0.149 |
| 12 | SiAlON | 30 | 40 | 1 | 300 | 400 | 1.5 | 521.6 | 0.142 |
| 13 | SiAlN | 30 | 40 | 0 | 200 | 400 | 1.5 | 465.9 | 0.105 |
| 14 | SiAlON | 30 | 40 | 0.4 | 200 | 400 | 1.5 | 352.1 | 0.076 |
| 15 | SiAlON | 30 | 40 | 1 | 200 | 400 | 1.5 | 478.5 | 0.101 |

TABLE 1-continued

Deposition conditions for Examples 1-22.

| Ex. | material | Ar (sccm) | N2 (sccm) | O2 (sccm) | Power Al (W) | Power Si (W) | Pressure (mtorr) | Thickness (nm) | GR (nm/s) |
|---|---|---|---|---|---|---|---|---|---|
| 16 | SiAlN  | 30 | 40 | 0   | 100 | 400 | 1.5 | 496.4 | 0.072 |
| 17 | SiAlON | 30 | 40 | 0.4 | 100 | 400 | 1.5 | 480.6 | 0.067 |
| 18 | SiAlON | 30 | 40 | 1   | 100 | 400 | 1.5 | 482.5 | 0.067 |
| 19 | SiN    | 30 | 40 | 0   | 0   | 400 | 1.5 | 540.3 | 0.046 |
| 20 | SiON   | 30 | 40 | 0.4 | 0   | 400 | 1.5 | 534.5 | 0.047 |
| 21 | SiON   | 30 | 40 | 1   | 0   | 400 | 1.5 | 512.4 | 0.050 |
| 22 | SiAlN  | 30 | 30 | 0   | 300 | 400 | 1.5 | 482.6 | 0.200 |

TABLE 2

Properties of Examples 1-22.

| Ex. | n of film @ 2.255 eV | k of film @ 3.1 eV | k of film @ 4.133 eV | AFM RA 2 um | Film stress (MPa) | Hardness (GPa) |
|---|---|---|---|---|---|---|
| 1  | 2.04729 | <1e−4 | 0.000626 | 3.81 | 534.6    | 13.9 |
| 2  | 1.99214 | <1e−4 | 0.002    | 1.44 | 897.1    | 17.2 |
| 3  | 1.96256 | <1e−4 | 0.00221  | 1.83 | −270.2   | 16.3 |
| 4  | 2.09175 | <1e−4 | 0.00743  | 2.63 | 767.9    | 19.6 |
| 5  | 2.04141 | <1e−4 | 0.0039   | 0.80 | 386.0    | 20   |
| 6  | 1.99751 | <1e−4 | 0.00206  | 1.27 | −588.1   | 17   |
| 7  | 2.10067 | <1e−4 | 0.00819  | 0.61 | 601.3    | 21.1 |
| 8  | 2.0683  | <1e−4 | 0.00389  | 1.07 | −126.0   | 19.5 |
| 9  | 2.03326 | <1e−4 | 0.00299  | 0.79 | −897.3   | 16.9 |
| 10 | 2.11042 | <1e−4 | 0.0081   | 1.57 | −217.4   | 17   |
| 11 | 2.08029 | <1e−4 | 0.00433  | 0.97 | −379.6   | 19.9 |
| 12 | 2.03366 | <1e−4 | 0.00251  | 0.54 | −775.5   | 16.6 |
| 13 | 2.11348 | <1e−4 | 0.00434  | 1.60 | −994.4   | 20.9 |
| 14 | 2.03651 | <1e−4 | 0        | 0.41 | −1162.9  | 17   |
| 15 | 1.98214 | <1e−4 | 3.22E−05 | 0.59 | −1044.6  | 15.5 |
| 16 | 2.09316 | <1e−4 | 0.00238  | 0.67 | −1433.3  | 18.7 |
| 17 | 1.97308 | <1e−4 | 3.39E−05 | 0.55 | −1437.3  | 16.8 |
| 18 | 1.87359 | <1e−4 | 0        | 0.34 | −1044.8  | 15.2 |
| 19 | 2.05752 | <1e−4 | 0.00429  | 0.19 | −1909.1  | 20.8 |
| 20 | 1.89874 | <1e−4 | 0        | 0.32 | −1442.5  | 17.6 |
| 21 | 1.73335 | <1e−4 | 0        | 0.29 | −957.0   | 13.8 |
| 22 | 2.11591 | <1e−4 | 0.01125  | 0.87 | 46.55691 | 20.8 |

TABLE 3

Composition of Examples 1-22.

| Ex. | Si (at %) | Al (at %) | O (at %) | N (at %) |
|---|---|---|---|---|
| 1  | 1.1  | 49.4 | 1.4  | 48.1 |
| 2  | 0.8  | 50.1 | 7.9  | 41.2 |
| 3  | 1.6  | 48.0 | 14.1 | 36.3 |
| 4  | 4.1  | 45.6 | 0.0  | 50.3 |
| 5  | 4.3  | 45.5 | 4.8  | 45.4 |
| 6  | 5.1  | 43.9 | 11.1 | 39.9 |
| 7  | 7.9  | 41.4 | 0.2  | 50.5 |
| 8  | 8.6  | 41.0 | 3.4  | 47.0 |
| 9  | 8.5  | 40.3 | 8.7  | 42.5 |
| 10 | 11.6 | 37.6 | 0.4  | 50.4 |
| 11 | 11.5 | 37.5 | 2.9  | 48.2 |
| 12 | 11.7 | 36.8 | 7.2  | 44.3 |
| 13 | 16.6 | 32.1 | 0.0  | 51.4 |
| 14 | 24.9 | 23.5 | 4.7  | 46.9 |
| 15 | 17.0 | 31.4 | 9.5  | 42.2 |
| 16 | 26.7 | 21.2 | 0.0  | 52.0 |
| 17 | 30.3 | 17.4 | 7.0  | 45.2 |
| 18 | 28.8 | 18.3 | 15.8 | 37.1 |
| 19 | 47.0 | 0.0  | 0.0  | 53.0 |
| 20 | 47.9 | 0.0  | 10.1 | 41.9 |
| 21 | 47.2 | 0.0  | 27.8 | 24.9 |
| 22 | 11.1 | 38.8 | 0.0  | 50.2 |

As shown above, Examples 8 and 22 exhibited the low compressive stress and low Ra roughness.

Examples 23-27

Examples 23-27 were single layers of optically transparent materials including compositions with silicon, aluminum, oxygen and nitrogen, where the amount of silicon is increased from Example 23 through Example 27. The layers were formed on the same substrates, using a physical vapor deposition process and vacuum chamber as Examples 1-22. The layers were formed using DC reactive sputtering combined with RF (called "RF superimposed DC") for the aluminum source or target (which was a single aluminum target), and RF excitation for the silicon source or target). The targets were 3" diameter silicon and 3" diameter aluminum. The reactive gasses were nitrogen and oxygen, and the "working" (or inert) gas was argon. The power supplied to the silicon (in watts) was radio frequency (RF) at 13.56 Mhz. The power supplied to the aluminum was DC (in watts).

Figure 4:
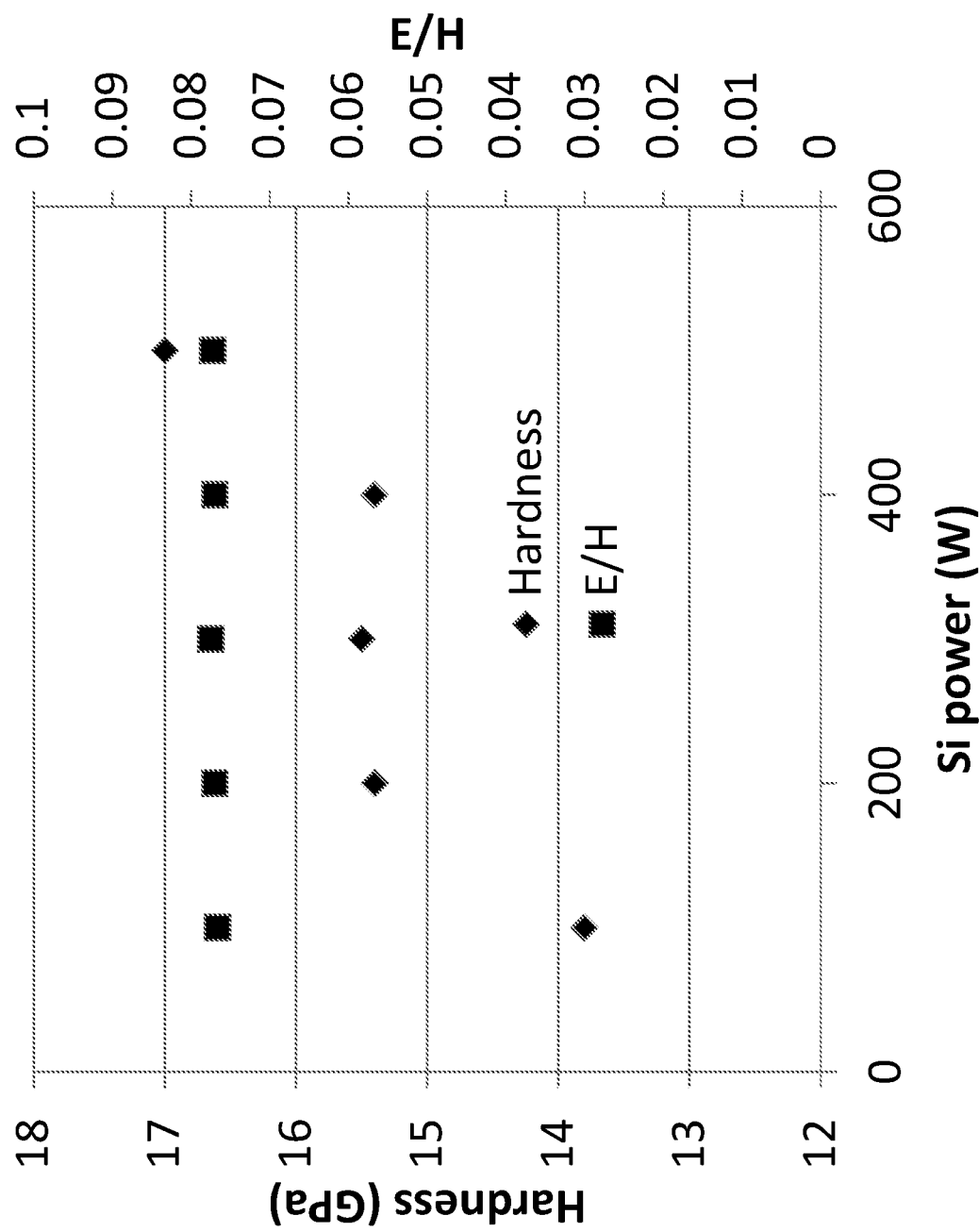
FIG. 4 is a graph illustrating the hardness and Young's modulus of an optically transparent material according to one or more embodiments.

Table 4 shows the deposition condition for each of Examples 23-27. FIG. 4 shows the Hardness (GPa) on the left axis and the ratio E/H (Young's modulus in GPa/Hardness in GPa) on the right axis, both as a function of power (in watts) supplied to the silicon target. Table 5 shows the measured hardness, Young's modulus, E/H, thickness (nm), refractive index (at a wavelength of 550 nm), extinction coefficient at a wavelength of 400 nm and at a wavelength of 300 nm, and compressive stress (Pa) of each of Examples 23-27.

TABLE 4

Deposition conditions for Examples 23-27.

| Ex. | Deposition time (seconds) | Ar (sccm) | N2 (sccm) | O2 (sccm) | Al power (RF) (W) | Al power (DC) (W) | Si power (RF) (W) | Pressure (mtorr) |
|---|---|---|---|---|---|---|---|---|
| 23 | 9000 | 30 | 30 | 0.5 | 200 | 300 | 500 | 4 |
| 24 | 9000 | 30 | 30 | 0.5 | 200 | 300 | 400 | 4 |
| 25 | 9000 | 30 | 30 | 0.5 | 200 | 300 | 300 | 4 |
| 26 | 9000 | 30 | 30 | 0.5 | 200 | 300 | 200 | 4 |
| 27 | 9000 | 30 | 30 | 0.5 | 200 | 300 | 100 | 4 |

TABLE 5

Hardness (H) (GPa), Young's Modulus (E) (GPa), H/E, thickness (nm), refractive index (n)(at a wavelength of 550 nm) and extinction coefficient (k) at a wavelength of 400 nm and at a wavelength of 300 nm, film stress (MPa) of Examples 23-27.

| Ex. | H | E | H/E | Thickness | n | k @ 400 nm | k @ 300 nm | Film stress |
|---|---|---|---|---|---|---|---|---|
| 23 | 17 | 220 | 0.0766 | 201.2 | 2.105 | 0.045 | 0.068 | −54 |
| 24 | 15.4 | 200 | 0.0772 | 869.3 | 2.051 | 0.013 | 0.023 | −94 |
| 25 | 15.5 | 200 | 0.0775 | 752.8 | 2.025 | 0.012 | 0.019 | −11 |
| 26 | 15.4 | 200 | 0.0767 | 606.9 | 2.036 | 0 | 0.009 | 72 |
| 27 | 13.8 | 180 | 0.0873 | 528.4 | 1.925 | 0 | 0.002 | 29 |

Examples 27-42

Examples 28-43 were single layers of materials including varying compositions. The layers were formed using the same physical vapor deposition process and vacuum chamber as Examples 23-27. The layers were formed using DC reactive sputtering combined with RF (called "RF superimposed DC") for the aluminum source (which was a single Al target), and RF excitation for the silicon source or target. The targets were 3" diameter silicon and 3" diameter aluminum. The reactive gasses were nitrogen and oxygen, and the "working" (or inert) gas was argon. The power supplied to the silicon (in watts) was radio frequency (RF) at 13.56 Mhz. The power supplied to the aluminum was DC (in watts).

Figure 5:
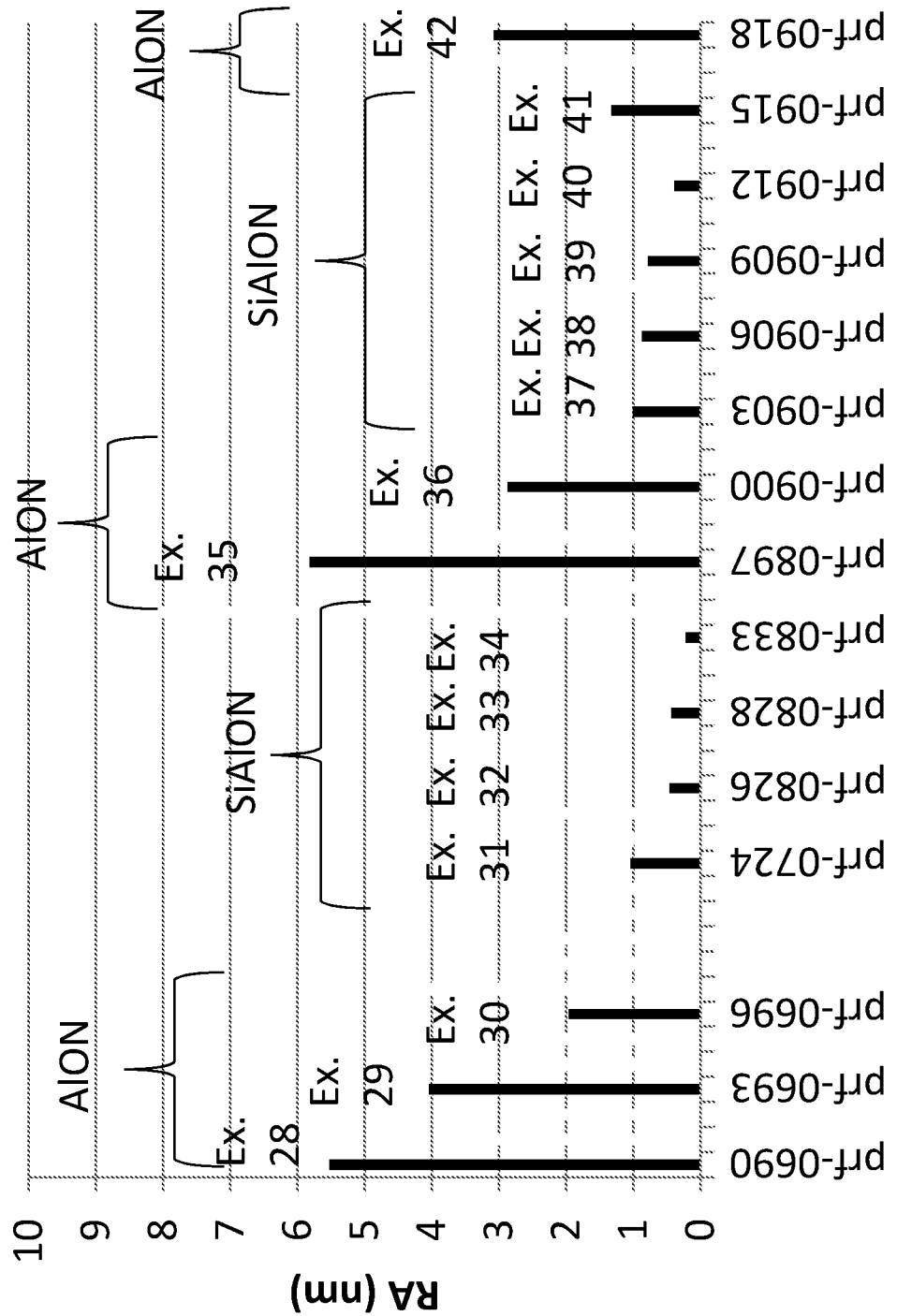
FIG. 5 is a graph illustrating roughness (Ra) of various embodiments of the optically transparent material.

Table 6 shows the deposition condition for each of Examples 28-43. FIG. 5 shows the roughness (Ra) of each of the samples.

TABLE 6

Deposition conditions for Examples 28-43.

| Ex. | Deposition time (seconds) | Ar (sccm) | N2 (sccm) | O2 (sccm) | Al power (RF) (W) | Al power (DC) (W) | Si power (RF) (W) | Pressure (mtorr) | Bias |
|---|---|---|---|---|---|---|---|---|---|
| 28 | 9000 | 30 | 15 | 0.25 | 200 | 300 | 0 | 4 | 0 |
| 29 | 9000 | 30 | 30 | 0.25 | 220 | 330 | 0 | 4 | 0 |
| 30 | 9000 | 30 | 30 | 0.25 | 200 | 300 | 0 | 4 | 0 |
| 31 | 9000 | 30 | 30 | 0.5 | 200 | 300 | 300 | 4 | 0 |
| 32 | 4128 | 30 | 30 | 0.5 | 200 | 300 | 500 | 2 | 0 |
| 33 | 4128 | 30 | 30 | 0.5 | 240 | 300 | 500 | 2 | 40 |
| 34 | 4128 | 30 | 30 | 0.25 | 240 | 300 | 550 | 1.5 | 40 |
| 35 | 9000 | 20 | 15 | 0.5 | 220 | 330 | 0 | 5 | 40 |
| 36 | 9000 | 30 | 15 | 0.5 | 160 | 240 | 0 | 5 | 40 |
| 37 | 9000 | 20 | 40 | 0.25 | 160 | 240 | 550 | 5 | 0 |
| 38 | 9000 | 30 | 30 | 0.5 | 300 | 200 | 500 | 3 | 0 |
| 39 | 9000 | 15 | 30 | 0.25 | 300 | 200 | 550 | 2.5 | 0 |
| 40 | 9000 | 30 | 30 | 0.5 | 200 | 300 | 500 | 2 | 0 |
| 41 | 9000 | 30 | 30 | 0.25 | 200 | 300 | 500 | 5 | 0 |
| 42 | 9000 | 30 | 30 | 0 | 300 | 200 | 0 | 4 | 40 |

It will be apparent to those skilled in the art that various modifications and variations can be made without departing from the spirit or scope of the invention. For example, the variations may include the following embodiments.

Embodiment 1

An optically transparent material comprising:

a composition comprising silicon, aluminum, and nitrogen;

an extinction coefficient (k) at a wavelength of 400 nm of less than about $1 \times 10^{-3}$, and an average transmittance of about 80% or greater, over an optical wavelength regime in the range from about 380 nm to about 780 nm, as measured through the material having a thickness of about 2 micrometers;

an intrinsic maximum hardness of about 12 GPa or greater as measured on a major surface of the material having a thickness of about 400 nm by a Berkovich Indenter Hardness Test along an indentation depth of about 100 nm or greater.

Embodiment 2

The optically transparent material of Embodiment 1, wherein the composition further comprises oxygen.

Embodiment 3

The optically transparent material of Embodiment 1 or Embodiment 2, wherein the material comprises a compressive stress in the range from about −1000 MPa to about 100 MPa, when disposed on a substrate.

Embodiment 4

The optically transparent material of Embodiment 3, wherein the compressive stress is in the range from about −300 MPa to about 100 MPa.

Embodiment 5

The optically transparent material of any one of the preceding Embodiments, wherein the material comprises a refractive index of about 2.0 or greater, as measured at a wavelength of 550 nm.

Embodiment 6

The optically transparent material of any one of the preceding Embodiments, wherein the material comprises a roughness (Ra) of less than 1.5 nm as measured by atomic force microscopy on the major surface along an imagining area having dimensions of 2 micrometers by 2 micrometers.

Embodiment 7

A optically transparent material comprising:
a composition comprising silicon, wherein silicon is present in an amount of about 25 atomic % or less, aluminum, oxygen in an amount of in the range from about 0 atomic % to about 15 atomic %, and nitrogen;
an average transmittance of about 80% or greater, over an optical wavelength regime in the range from about 380 nm to about 780 nm, as measured through the material having a thickness of 2 micrometers;
an intrinsic maximum hardness of about 12 GPa or greater as measured on a major surface of the material having a thickness of about 400 nm by a Berkovich Indenter Hardness Test along an indentation depth of about 100 nm or greater.

Embodiment 8

The optically transparent material of Embodiment 7, wherein the composition comprises silicon in an amount in a range from about 5 atomic % to about 25 atomic %, aluminum in an amount in a range from about 25 atomic % to about 45 atomic %, oxygen in an amount in a range from about 0 atomic % to about 15 atomic %, and nitrogen in an amount in a range from about 35 atomic % to about 50 atomic %.

Embodiment 9

The optically transparent material of Embodiment 7, wherein the composition comprises silicon in an amount in a range from about 7 atomic % to about 17 atomic %, aluminum in an amount in a range from about 33 atomic % to about 43 atomic %, oxygen in an amount in a range from about 0 atomic % to about 10 atomic %, and nitrogen in an amount in a range from about 40 atomic % to about 50 atomic %.

Embodiment 10

The material of any one of Embodiments 7-9, wherein the composition comprises at least about 0.1 atomic % oxygen.

Embodiment 11

The optically transparent material of any one of Embodiments 7-10, wherein the material comprises a compressive stress in the range from about −1000 MPa to about 100 MPa, when disposed on a substrate.

Embodiment 12

The optically transparent material of any one of Embodiments 7-11, wherein the material comprises an extinction coefficient (k) at a wavelength of 400 nm of less than about $1 \times 10^{-3}$, as measured through the material having a thickness of about 400 nm.

Embodiment 13

The optically transparent material of any one of Embodiments 7-12, wherein the material comprises a refractive index of about 2.0 or greater, as measured at a wavelength of 550 nm.

Embodiment 14

The optically transparent material of any one of Embodiments 7-13, wherein the material comprises a roughness (Ra) of less than 1.5 nm as measured by atomic force microscopy on the major surface along an imagining area having dimensions of 2 micrometers by 2 micrometers.

Embodiment 15

An article comprising:
a substrate comprising a major surface, substrate transmittance color coordinates ($a^*_{substrate}$, $b^*_{substrate}$) and substrate reflectance color coordinates ($a^*_{substrate}$, $b^*_{substrate}$), wherein the substrate transmittance color coordinates and the substrate reflectance color coordinates are in the ($L^*$, $a^*$, $b^*$) colorimetry system and are measured at an incidence illumination angle of 5 degrees from normal incidence under an International Commission on Illumination illuminant; and
an optical film having a thickness in a range from about 200 nm to about 3 micrometers disposed on the major surface forming a coated surface, the optical film comprising an optically transparent material comprising silicon, aluminum, and nitrogen, and wherein the article exhibits a maximum hardness of about 12 GPa or greater as measured on the coated surface by a Berkovich Indenter Hardness Test along an indentation depth of about 100 nm or greater;

wherein the article exhibits a single side average photopic reflectance measured at the coated surface of about 8% or less over an optical wavelength regime in the range from about 380 nm to about 780 nm and either one or both of:

article transmittance color coordinates in the (L*, a*, b*) colorimetry system, when measured at an incidence illumination angle of normal incidence under an International Commission on Illumination illuminant, comprising a reference point color shift of less than about 2 from a reference point, the reference point comprising one of the color coordinates (a*=0, b*=0) and the substrate transmittance color coordinates, and article reflectance color coordinates in the (L*, a*, b*) colorimetry system when measured at the coated surface at an incidence illumination angle of 5 degrees from normal incidence under an International Commission on Illumination illuminant, exhibiting a reference point color shift of less than about 5 from a reference point as measured at the anti-reflective surface, the reference point comprising at least one of the color coordinates (a*=0, b*=0), the color coordinates (a*=−2, b*=−2), and the substrate reflectance color coordinates, wherein, when the reference point is the color coordinates (a*=0, b*=0), the color shift is defined by $\sqrt{((a^*_{article})^2+(b^*_{article})^2)}$, wherein, when the reference point is the color coordinates (a*=−2, b*=−2), the color shift is defined by $\sqrt{((a^*_{article}+2)^2+(b^*_{article}+2)^2)}$, and wherein, when the reference point is the color coordinates of the substrate, the color shift is defined by $\sqrt{((a^*_{article}-a^*_{substrate})^2+(b^*_{article}-b^*_{substrate})^2)}$.

Embodiment 16

The article of Embodiment 15, wherein the optically transparent material further comprises oxygen.

Embodiment 17

The article of Embodiment 15 or Embodiment 16, wherein the optically transparent material comprises a compressive stress in the range from about −1000 MPa to about 100 MPa.

Embodiment 18

The article of any one of Embodiments 15-17, wherein the optically transparent material comprises a first layer and the optical film further comprises a second layer.

Embodiment 19

The article of Embodiment 18, wherein the first layer is disposed on the major surface of the substrate and the second layer is disposed on the first layer.

Embodiment 20

The article of Embodiment 18, wherein the second layer is disposed on the major surface of the substrate and the first layer is disposed on the second layer.

Embodiment 21

The article of Embodiment 18, wherein the transparent material comprises a refractive index greater than a refractive index of the second layer and wherein the optical film comprises a plurality of first layers and second layers that alternate.

Embodiment 22

The article of any one of Embodiments 15-21, wherein the single side average photopic reflectance of the article is about 2% or less over the optical wavelength regime at a viewing angle in the range from about 6 degrees to about 40 degrees.

Embodiment 23

The article of any one of Embodiments 15-22, wherein the substrate comprises an amorphous substrate or a crystalline substrate.

Embodiment 24

The article of any one of Embodiments 15-23, wherein the substrate comprises a Young's modulus of about 60 GPa or greater.

Embodiment 25

The article of Embodiment any one of Embodiments 15-24, wherein the amorphous substrate comprises a glass selected from the group consisting of soda lime glass, alkali aluminosilicate glass, alkali containing borosilicate glass and alkali aluminoborosilicate glass.

Embodiment 26

The article of Embodiment 25, wherein the glass is strengthened and comprises a compressive stress (CS) layer with a surface CS of at least 200 MPa extending from a surface of the strengthened glass to a depth of compression of about 10 m or greater.

Embodiment 27

The article of any one of Embodiments 15-26, wherein the first layer comprises a thickness in the range from about 0.4 micrometer to about 3 micrometers.

Embodiment 28

A device comprising:
a housing having front, back, and side surfaces;
electrical components that are at least partially inside the housing;
a display at or adjacent to the front surface of the housing; and
a cover article disposed over the display, wherein the cover article comprises the article of any one of Embodiments 15-27.

What is claimed is:
1. An article, comprising:
a substrate comprising a major surface, substrate transmittance color coordinates ($a^*_{substrate}$, $b^*_{substrate}$) and substrate reflectance color coordinates ($a^*_{substrate}$, $b^*_{substrate}$), wherein the substrate transmittance color coordinates and the substrate reflectance color coordinates are in the (L*, a*, b*) colorimetry system and are measured at an incidence illumination angle of 5 degrees from normal incidence under an International Commission on Illumination illuminant; and an optical film having a thickness from about 200 nm to about 3 micrometers disposed on the major surface forming a coated surface, the optical film comprising an optically transparent material comprising silicon, aluminum, and nitrogen, wherein silicon is in an amount from about 0.1 atomic % to about 30 atomic %, and wherein the article exhibits a maximum hardness of about 12 GPa or greater as measured on the coated surface by a Berkovich Indenter Hardness Test along an indentation depth of about 100 nm or greater;

wherein the article exhibits a single side average photopic reflectance measured at the coated surface of about 8% or less over an optical wavelength regime from about 380 nm to about 780 nm and either one or both of:

article transmittance color coordinates in the (L*, a*, b*) colorimetry system, when measured at an incidence illumination angle of normal incidence under an International Commission on Illumination illuminant, comprising a reference point color shift of less than about 2 from a reference point, the reference point comprising one of the color coordinates (a*=0, b*=0) and the substrate transmittance color coordinates, and article reflectance color coordinates in the (L*, a*, b*) colorimetry system when measured at the coated surface at an incidence illumination angle of 5 degrees from normal incidence under an International Commission on Illumination illuminant, exhibiting a reference point color shift of less than about 5 from a reference point as measured at the anti-reflective surface, the reference point comprising at least one of the color coordinates (a*=0, b*=0), the color coordinates (a*=−2, b*=−2), and the substrate reflectance color coordinates, wherein, when the reference point is the color coordinates (a*=0, b*=0), the color shift is defined by $\sqrt{((a^*_{article})^2+(b^*_{article})^2)}$, wherein, when the reference point is the color coordinates (a*=−2, b*=−2), the color shift is defined by $\sqrt{((a^*_{article}+2)^2+(b^*_{article}+2)^2)}$, and wherein, when the reference point is the color coordinates of the substrate, the color shift is defined by $\sqrt{((a^*_{article}-a^*_{substrate})^2+(b^*_{article}-b^*_{substrate})^2)}$.

2. The article of claim 1, wherein the optically transparent material further comprises oxygen.

3. The article of claim 1, wherein the optically transparent material comprises a compressive stress from about −1000 MPa to about 100 MPa.

4. The article of claim 1, wherein the optically transparent material comprises a first layer and the optical film further comprises a second layer.

5. The article of claim 4, wherein one of:
the first layer is disposed on the major surface of the substrate and the second layer is disposed on the first layer; and
the second layer is disposed on the major surface of the substrate and the first layer is disposed on the second layer.

6. The article of claim 4, wherein the optically transparent material comprises a refractive index greater than a refractive index of the second layer and wherein the optical film comprises a plurality of first layers and second layers that alternate.

7. The article of claim 1, wherein at least one of:
the single side average photopic reflectance of the article is about 2% or less over the optical wavelength regime at a viewing angle from about 6 degrees to about 40 degrees;
the substrate comprises a Young's modulus of about 60 GPa or greater;
the glass is strengthened and comprises a compressive stress (CS) layer with a surface CS of at least 200 MPa extending from a surface of the strengthened glass to a depth of compression of about 10 μm or greater; and
the first layer comprises a thickness from about 0.4 micrometer to about 3 micrometers.

8. A device, comprising:
a housing having front, back, and side surfaces;
electrical components that are at least partially inside the housing;
a display at or adjacent to the front surface of the housing; and
a cover article disposed over the display, wherein the cover article comprises the article of claim 1.

9. An article, comprising:
a substrate comprising a major surface; and
an optical film having a thickness from about 200 nm to about 3 micrometers disposed on the major surface forming a coated surface,
wherein the optical film comprises an optically transparent material comprising silicon, aluminum, and nitrogen, wherein silicon is in an amount from about 0.1 atomic % to about 30 atomic %,
wherein the optical film exhibits an extinction coefficient (k) of less than about $1\times10^{-3}$ at a wavelength of 400 nm, and an average transmittance of about 80% or greater, over an optical wavelength regime from about 380 nm to about 780 nm, as measured through the optically transparent material having a thickness of about 2 micrometers, and
further wherein the article exhibits a maximum hardness of about 12 GPa or greater as measured on the coated surface by a Berkovich Indenter Hardness Test along an indentation depth of about 100 nm or greater.

10. The article of claim 9, wherein the optically transparent material further comprises oxygen.

11. The article of claim 9, wherein at least one of:
the optically transparent material comprises a refractive index of about 2.0 or greater, as measured at a wavelength of 550 nm; and
the optically transparent material comprises a roughness (Ra) of less than 1.5 nm as measured by atomic force microscopy on the major surface along an imaging area having dimensions of 2 micrometers by 2 micrometers.

12. The article of claim 9, wherein the optically transparent material comprises aluminum in an amount from about 25 atomic % to about 44 atomic % and nitrogen in an amount from about 36 atomic % to about 50 atomic %.

13. The article of claim 9, wherein the optically transparent material comprises a compressive stress from about −1000 MPa to about 100 MPa.

14. A device, comprising:
a housing having front, back, and side surfaces;
electrical components that are at least partially inside the housing;
a display at or adjacent to the front surface of the housing; and
a cover article disposed over the display, wherein the cover article comprises the article of claim 9.

15. An article, comprising:
a substrate comprising a major surface; and
an optical film having a thickness from about 200 nm to about 3 micrometers disposed on the major surface forming a coated surface,
wherein the optical film comprises silicon in an amount of about 25 atomic % or less, aluminum, oxygen in an amount from about 0 atomic % to about 15 atomic %, and nitrogen,
wherein the optical film exhibits an average transmittance of about 80% or greater, over an optical wavelength regime from about 380 nm to about 780 nm, as measured through the film having a thickness of 2 micrometers, and
further wherein the article exhibits a maximum hardness of about 12 GPa or greater as measured on the coated surface by a Berkovich Indenter Hardness Test along an indentation depth of about 100 nm or greater.

16. The article of claim 15, wherein the optical film comprises silicon in an amount from about 5 atomic % to about 25 atomic %, aluminum in an amount from about 25 atomic % to about 45 atomic %, oxygen in an amount from about 0 atomic % to about 15 atomic %, and nitrogen in an amount from about 35 atomic % to about 50 atomic %.

17. The article of claim 15, wherein the optical film comprises from about 0.1 atomic % oxygen to about 15 atomic %.

18. The article of claim 15, wherein at least one of:
the optical film comprises an extinction coefficient (k) of less than about $1 \times 10^{-3}$ at a wavelength of 400 nm, as measured through the film having a thickness of about 400 nm;
the optical film comprises a refractive index of about 2.0 or greater, as measured at a wavelength of 550 nm; and
the optical film comprises a roughness (Ra) of less than 1.5 nm as measured by atomic force microscopy on the major surface along an imaging area having dimensions of 2 micrometers by 2 micrometers.

19. The article of claim 15, wherein the optical film comprises aluminum in an amount from about 25 atomic % to about 44 atomic % and nitrogen in an amount from about 36 atomic % to about 50 atomic %.

20. A device, comprising:
a housing having front, back, and side surfaces;
electrical components that are at least partially inside the housing;
a display at or adjacent to the front surface of the housing; and
a cover article disposed over the display, wherein the cover article comprises the article of claim 15.

* * * * *

UNITED STATES PATENT AND TRADEMARK OFFICE
CERTIFICATE OF CORRECTION

| | |
|---|---|
| PATENT NO. | : 11,203,179 B2 |
| APPLICATION NO. | : 16/793644 |
| DATED | : December 21, 2021 |
| INVENTOR(S) | : Charles Andrew Paulson et al. |

It is certified that error appears in the above-identified patent and that said Letters Patent is hereby corrected as shown below:

In the Specification

In Column 1, Line 12, delete "62/349,506" and insert -- 62/349,506, --.

Signed and Sealed this
Eighteenth Day of July, 2023

Katherine Kelly Vidal
*Director of the United States Patent and Trademark Office*